US012620823B2

(12) United States Patent
Umehara et al.

(10) Patent No.: US 12,620,823 B2
(45) Date of Patent: May 5, 2026

(54) POWER SUPPLY CONTROL APPARATUS AND ELECTRIC DISCHARGE METHOD

(71) Applicant: TOYOTA JIDOSHA KABUSHIKI KAISHA, Toyota (JP)

(72) Inventors: Takahiro Umehara, Susono (JP); Nobuyuki Kitamura, Minamitsuru-gun (JP); Kota Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 617 days.

(21) Appl. No.: 18/311,994

(22) Filed: May 4, 2023

(65) Prior Publication Data

US 2023/0378786 A1 Nov. 23, 2023

(30) Foreign Application Priority Data

May 17, 2022 (JP) ................................. 2022-080960

(51) Int. Cl.
*H02J 7/00* (2026.01)
*H01M 8/04746* (2016.01)
*H02J 7/14* (2006.01)
*H02J 7/80* (2026.01)

(52) U.S. Cl.
CPC ........... *H02J 7/80* (2026.01); *H01M 8/04753* (2013.01)

(58) Field of Classification Search
CPC ...... H02J 7/80; H02J 7/875; H02J 7/90; H02J 2101/00; H02J 2101/10; H02J 2101/20; H02J 2101/30
USPC ........................................................ 320/101
See application file for complete search history.

(56) References Cited

U.S. PATENT DOCUMENTS

| | | | | |
|---|---|---|---|---|
| 10,239,405 | B2* | 3/2019 | Suzuki ............. | H01M 8/04955 |
| 10,511,040 | B2* | 12/2019 | Matsumoto ............ | B60L 58/12 |
| 10,850,596 | B2 | 12/2020 | Imanishi et al. | |
| 2006/0278450 | A1* | 12/2006 | Shirasaka ............... | B60L 58/30 |
| | | | | 180/65.265 |
| 2008/0238430 | A1 | 10/2008 | Page et al. | |
| 2015/0380788 | A1* | 12/2015 | Kazuno ............... | H01M 16/006 |
| | | | | 429/9 |
| 2018/0375135 | A1* | 12/2018 | Kumada ........... | H01M 8/04201 |
| 2021/0098806 | A1* | 4/2021 | Sakai ....................... | B60L 50/70 |
| 2022/0024326 | A1* | 1/2022 | Kitamoto ................ | B60L 50/75 |

(Continued)

FOREIGN PATENT DOCUMENTS

JP 2011090823 A 5/2011

*Primary Examiner* — Alexis B Pacheco
(74) *Attorney, Agent, or Firm* — Hunton Andrews Kurth LLP

(57) ABSTRACT

A power supply control apparatus includes a switching control device configured to switch each of switching elements of a power converter between an on state and an off state alternately, and a discharge control device configured to, when residual charge of the fuel cell is discharged, control a gas supply unit such that oxidant gas is not supplied to the fuel cell, in a first period, control the switching control device such that an on time during which at least one switching element is maintained in the on state is longer than the on time during an operation of the fuel cell and the at least one switching element is switched between the on state and the off state alternately, and, in a second period subsequent to the first period, control the switching control device such that the at least one switching element continues to maintain the on state.

6 Claims, 2 Drawing Sheets

(56) References Cited

U.S. PATENT DOCUMENTS

| 2022/0059855 | A1* | 2/2022 | Mori | .................... H01M 8/249 |
| 2022/0302483 | A1* | 9/2022 | Jimba | ............... H01M 8/04559 |
| 2022/0314817 | A1* | 10/2022 | Igarashi | ................. B60L 58/12 |
| 2024/0322208 | A1* | 9/2024 | Tsujiguchi | ........ H01M 8/04231 |

* cited by examiner

POWER SUPPLY CONTROL APPARATUS AND ELECTRIC DISCHARGE METHOD

CROSS-REFERENCE TO RELATED APPLICATION

This application claims priority to Japanese Patent Application No. 2022-080960 filed on May 17, 2022, incorporated herein by reference in its entirety.

BACKGROUND

1. Technical Field

The disclosure relates to a technical field of a power supply control apparatus and an electric discharge method in a power supply system including a fuel cell.

2. Description of Related Art

As an apparatus of this type, there is suggested, for example, a power supply system including a fuel cell and a power converter configured to convert electric power output from the fuel cell (see Japanese Unexamined Patent Application Publication No. 2011-090823 (JP 2011-090823 A)). In the power supply system, a relay is disposed between the power converter and an inverter configured to supply electric power to a drive motor.

SUMMARY

For example, a junction box is often provided at a connection point between a power supply system and an electrical circuit for supplying electric power to a drive motor in order to protect the connection point. Terminals corresponding to the connection point are disposed in the junction box. A lid of the junction box can be opened due to, for example, maintenance or the like. At this time, from the viewpoint of preventing an electric shock accident, laws and regulations stipulate that the voltage between the terminals must be decreased to a predetermined voltage or below within a predetermined period of time from when the lid of the junction box is opened.

As in the case of the power supply system described in JP 2011-090823 A, in an electrical circuit having a relay, when the relay is set to an off state, the voltage between the terminals is relatively quickly decreased. Incidentally, when, for example, a power supply system is mounted on a vehicle, it is difficult to ensure space for mounting a relay. In addition, when a relay is mounted, a manufacturing cost increases.

The disclosure provides a power supply control apparatus and an electric discharge method capable of relatively quickly decreasing the voltage between terminals in a junction box without using a relay.

A first aspect of the disclosure relates to a power supply control apparatus that controls a power supply. The power supply has a fuel cell, a gas supply unit configured to supply oxidant gas to the fuel cell, and a power converter having a plurality of switching elements and configured to convert electric power output from the fuel cell. The power supply control apparatus includes a switching control device and a discharge control device. The switching control device is configured to switch each of the plurality of switching elements between an on state and an off state alternately. The discharge control device is configured to, when residual charge remaining in the fuel cell is being discharged, control the gas supply unit such that the oxidant gas is not supplied to the fuel cell, in a first period, control the switching control device such that an on time that is a time during which at least one switching element of the plurality of switching elements is maintained in the on state is longer than the on time allowed to be taken during an operation of the fuel cell and the at least one switching element is switched between the on state and the off state alternately, and, in a second period subsequent to the first period, control the switching control device such that the at least one switching element continues to maintain the on state.

In the above aspect, the second period may be a period during which the residual charge is less than a predetermined value.

In the above aspect, the discharge control device may be configured to determine whether the residual charge is less than the predetermined value, and the discharge control device may be configured to, when the discharge control device determines that the residual charge is less than the predetermined value, control the switching control device such that the at least one switching element continues to maintain the on state.

In the above aspect, the discharge control device may be configured to estimate the residual charge based on an output current of the fuel cell in the first period.

In the above aspect, the discharge control device may be configured to estimate the residual charge based on a voltage of the fuel cell.

A second aspect of the disclosure relates to an electric discharge method. The electric discharge method is an electric discharge method of discharging residual charge remaining in a fuel cell in a power supply. The power supply has a fuel cell, a gas supply unit configured to supply oxidant gas to the fuel cell, a power converter having a plurality of switching elements and configured to convert electric power output from the fuel cell, and a switching control device configured to switch each of the plurality of switching elements between an on state and an off state alternately. The electric discharge method includes controlling the gas supply unit such that the oxidant gas is not supplied to the fuel cell, in a first period, controlling the switching control device such that an on time that is a time during which at least one switching element of the plurality of switching elements is maintained in the on state is longer than the on time allowed to be taken during an operation of the fuel cell and the at least one switching element is switched between the on state and the off state alternately, and, in a second period subsequent to the first period, controlling the switching control device such that the at least one switching element continues to maintain the on state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a power supply control apparatus and an electric discharge method will be described. In the embodiment described below, an example in which the power supply control apparatus and the electric discharge method are applied to a vehicle 1 equipped with a power supply system including a fuel cell stack 12 will be described.

Configuration of Vehicle

Figure 1:
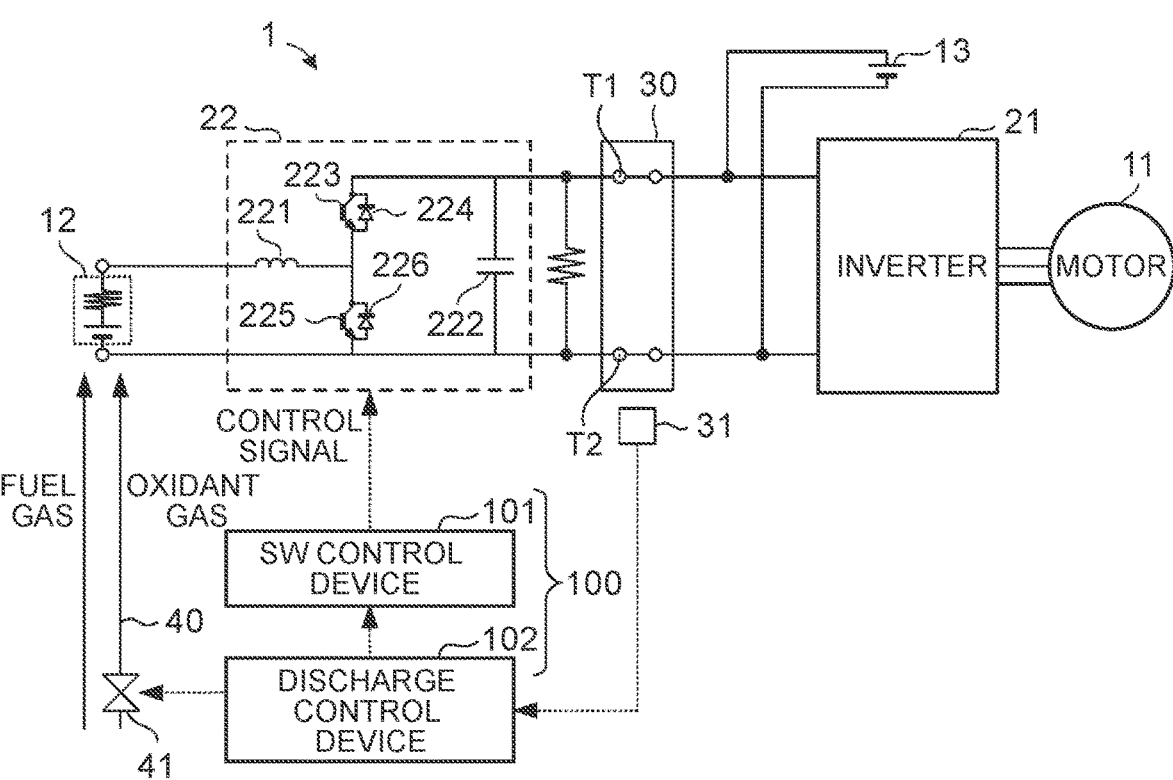
FIG. 1 is a diagram that shows the configuration of a vehicle.

The vehicle 1 according to the embodiment will be described with reference to FIG. 1 to FIG. 4. As shown in FIG. 1, the vehicle 1 includes a drive motor 11, the fuel cell stack 12, a battery 13, an inverter 21 capable of supplying alternating-current power to the drive motor 11, a step-up converter 22 disposed between the fuel cell stack 12 and the inverter 21, and a power supply control apparatus 100.

A flow channel 40 for supplying the fuel cell stack 12 with oxidant gas is connected to the fuel cell stack 12. A valve 41 for adjusting the flow rate of oxidant gas is provided in the flow channel 40. A flow channel for supplying the fuel cell stack 12 with fuel gas is connected to the fuel cell stack 12 (not shown). The battery 13 may be a so-called high-voltage battery. The inverter 21 may have six transistors serving as switching elements, and six antiparallel diodes respectively corresponding to the six transistors (not shown).

A power supply circuit and a junction box 30 are disposed between the inverter 21 and the step-up converter 22. The power supply circuit includes the fuel cell stack 12 and the step-up converter 22. The junction box 30 protects a connection point with an electrical circuit including the inverter 21. Terminals T1, T2 corresponding to the connection point are disposed inside the junction box 30.

The step-up converter 22 has a reactor 221, a smoothing capacitor 222, a transistor 223 and a diode 224 of an upper arm, and a transistor 225 and a diode 226 of a lower arm. The emitter of the transistor 223 and the collector of the transistor 225 are electrically connected and are also electrically connected to one end of the reactor 221. The other end of the reactor 221 is electrically connected to the positive electrode of the fuel cell stack 12. The collector of the transistor 223 is electrically connected to a power supply line of the inverter 21. The emitter of the transistor 225 is electrically connected to a ground line of the inverter 21 and the negative electrode of the fuel cell stack 12. The smoothing capacitor 222 is electrically connected between the power supply line and ground line of the inverter 21. The configuration of the step-up converter 22 shown in FIG. 1 is an example and is not limited thereto.

The power supply control apparatus 100 includes a switching control device 101 (hereinafter, referred to as "SW control device 101" as needed) and a discharge control device 102. The SW control device 101 performs switching control over the transistors 223, 225 during the operation of the fuel cell stack 12. The SW control device 101 may perform switching control over the transistors 223, 225 by inputting a control signal as shown in, for example, FIG. 2A, to the base of each of the transistors 223, 225. As a result, the voltage of direct-current power output from the fuel cell stack 12 is stepped up by the step-up converter 22 to a predetermined voltage and supplied to the inverter 21. The SW control device 101 may perform, for example, pulse width modulation (PWM) control as switching control. The SW control device 101 may perform switching control of the inverter 21 in addition to the step-up converter 22.

The junction box 30 has a sensor 31 that detects that the lid of the junction box 30 is open. When the sensor 31 detects that the lid of the junction box 30 is open, the discharge control device 102 executes a process of discharging the fuel cell stack 12 to decrease the voltage between the terminals T1, T2.

Discharge Process

Figure 2A:
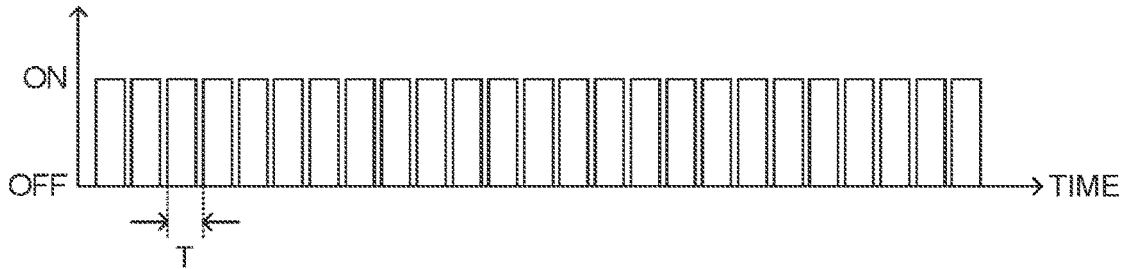
FIG. 2A is a graph that shows an example of a control signal.
Figure 2B:
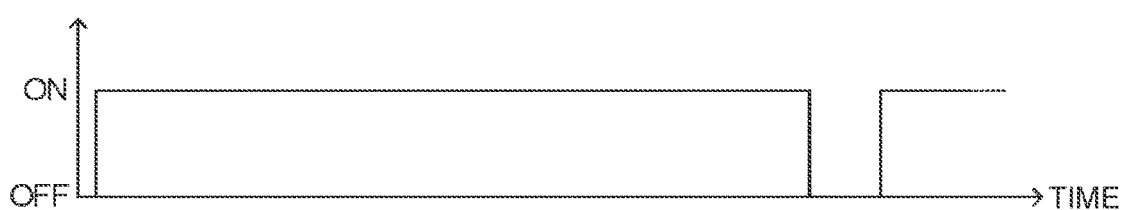
FIG. 2B is a graph that shows an example of a control signal.
Figure 3:
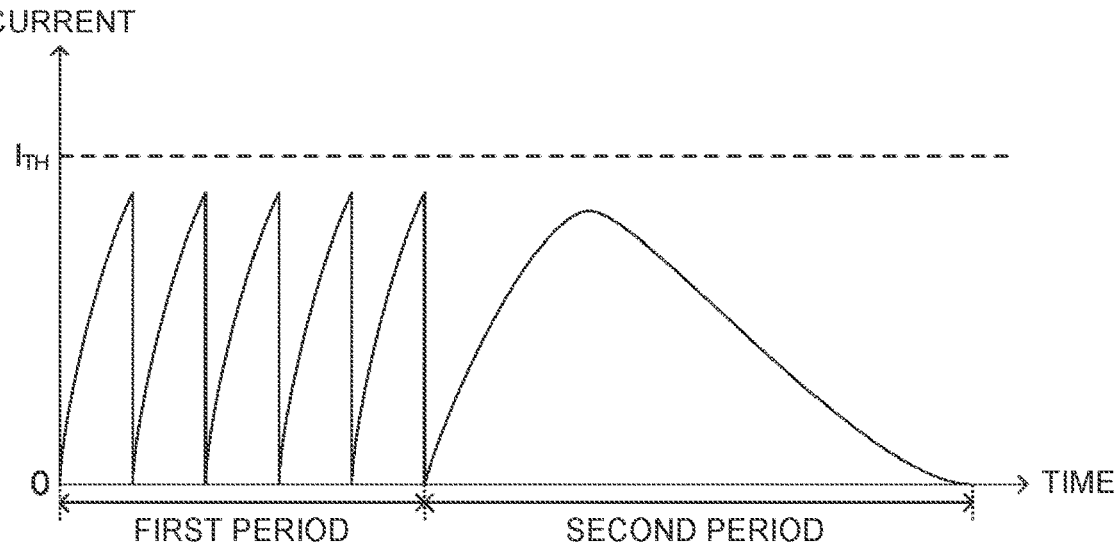
FIG. 3 is a graph that shows an example of a temporal change in current.

The discharge process that is executed by the discharge control device 102 will be specifically described with reference to FIG. 2A, FIG. 2B, and FIG. 3 in addition to FIG. 1. When the sensor 31 detects that the lid of the junction box 30 is open, the discharge control device 102 controls the valve 41 such that oxidant gas is not supplied to the fuel cell stack 12. At this time, the discharge control device 102 may set the valve 41 in a fully closed state. As a result, an electrochemical reaction in the fuel cell stack 12 is stopped (that is, power generation is stopped).

The discharge control device 102 may directly control the valve 41 or may indirectly control the valve 41 via, for example, a controller (not shown) concerned with, the fuel cell stack 12. The discharge control device 102 may further control a valve (not shown) provided in, for example, a flow channel for fuel gas such that fuel gas is not supplied to the fuel cell stack 12.

The discharge control device 102 controls the SW control device 101 such that the transistor 223 of the upper arm of the step-up converter 22 is set to an off state. The discharge control device 102 further controls the SW control device 101 such that the transistor 225 of the lower arm of the step-up converter 22 is set to an on state. In this way, current flows from the positive electrode of the fuel cell stack 12 via the transistor 225 to the negative electrode of the fuel cell stack 12 (that is, the fuel cell stack 12 is short-circuited).

However, when the discharge process is started, a relatively large amount of residual charge remains in the fuel cell stack 12. For this reason, if the transistor 225 is kept in the on state, a relatively large current flows through the lower arm of the step-up converter 22. Then, for example, a mechanism for protecting against overcurrent activates, with the result that the discharge process is not able to be continued.

The discharge control device 102 controls the SW control device 101 such that the transistor 225 is switched between the on state and the off state alternately. At this time, the SW control device 101 may switch the transistor 225 between the on state and the off state alternately (that is, may perform switching control over the transistor 225) by inputting a control signal as shown in, for example, FIG. 2B to the base of the transistor 225.

For example, it is assumed that, when the current value of the lower arm of the step-up converter 22 exceeds a predetermined current value $I_{TH}$ (see FIG. 3), the mechanism for protecting against overcurrent activates. Before the current value of the lower arm of the step-up converter 22 exceeds the predetermined current value $I_{TH}$, the discharge control device 102 controls the SW control device 101 such that the transistor 225 is switched from the on state to the off state. Specifically, before the current value of the lower arm of the step-up converter 22 exceeds the predetermined current value $I_{TH}$, the discharge control device 102 determines an on time of the control signal (that is, a time during which the transistor 225 is maintained in the on state) shown in, for example, FIG. 2B such that the transistor 225 is switched from the on state to the off state.

The discharge control device 102 may, for example, determine the on time as follows. For example, it is assumed that information indicating the relationship between the residual charge of the fuel cell stack 12, the on time, and the current value of the lower arm of the step-up converter 22 is known (the information may be stored in, for example, a memory or the like of the discharge control device 102). The discharge control device 102 may estimate residual charge in the fuel cell stack 12 based on, for example, the specifications of the fuel cell stack 12, an amount of electric charge discharged through the discharge process, and the like. The discharge control device 102 may determine an on time with which the current value of the lower arm of the step-up converter 22 does not exceed the predetermined current value $I_{TH}$ from the relationship represented by the estimated residual charge and the information.

For example, the on time (see FIG. 2B) determined as described above is longer than the on time (see FIG. 2A) of each of the transistors 223, 225 during the operation of the fuel cell stack 12. For example, one period of the control signal shown in FIG. 2B is longer than a period T that is one period of the control signal shown in FIG. 2A. In the discharge process, the discharge control device 102 may control the SW control device 101 such that the period of a control signal is longer than the period T of a control signal during the operation of the fuel cell stack 12 (in other words, the period of a control signal is changed). The discharge control device 102 may change, for example, a duty ratio instead of changing the period of a control signal. The duty ratio is the ratio of the on time to the period T of a control signal during the operation of the fuel cell stack 12. In other words, the discharge control device 102 may implement the control signal shown in FIG. 2B by setting the duty ratio to 100% for a plurality of temporally successive periods T and setting the duty ratio to 0% for one or plurality of periods T subsequent to the plurality of temporally successive periods T.

In the discharge process, the discharge control device 102 sets the transistor 223 of the step-up converter 22 to the off state and controls the SW control device 101 such that the transistor 225 is switched between the on state and the off state alternately. Thus, a short circuit of the fuel cell stack 12 and a release of the short circuit are repeated in a relatively short period. This situation is referred to as "multiple short circuits" as needed hereinafter. When multiple short circuits are performed, current passing through the lower arm of the step-up converter 22 changes in a sawtooth shape (see the "first period" in FIG. 3) as shown in, for example, FIG. 3. Through the multiple short circuits, it is possible to, for example, discharge residual charge remaining in the fuel cell stack 12 while avoiding activation of the mechanism for protecting against overcurrent.

In this way, the discharge control device 102 controls the SW control device 101 such that the transistor 225 is switched between the on state and the off state alternately while the on time that is a time during which the transistor 225 serving as a switching element maintains the on state is set so as to be longer than an on time allowed to be taken during the operation of the fuel cell stack 12 in a first period at the time when residual charge remaining in the fuel cell stack 12 is discharged.

Through the above-described multiple short circuits, when residual charge remaining in the fuel cell stack 12 becomes such residual charge that the current value of the lower arm of the step-up converter 22 does not exceed the predetermined current value $I_{TH}$ (see FIG. 3) even when the transistor 225 is maintained in the on state (in other words, residual charge becomes less than the predetermined value), the discharge control device 102 controls the SW control device 101 such that the transistor 225 continues to maintain the on state instead of multiple short circuits.

The discharge control device 102 may estimate residual charge based on, for example, the output current of the fuel cell stack 12 in a first period to perform multiple short circuits. The output current of the fuel cell stack 12 should be measured with, for example, an existing ammeter or the like. The discharge control device 102 may estimate residual charge based on, for example, the output voltage of the fuel cell stack 12 in a first period to perform multiple short circuits. The output voltage of the fuel cell stack 12 should be measured with, for example, an existing voltmeter or the like.

The "predetermined value" is a value used to determine whether to control the SW control device 101 such that the transistor 225 continues to maintain the on state instead of multiple short circuits and may be set as a fixed value in advance or a variable value according to a certain physical quantity or parameter. A specific value of such a predetermined value may be, for example, determined as follows. In other words, for example, the relationship between the residual charge of the fuel cell stack 12 and the current value of the lower arm of the step-up converter 22 may be obtained experimentally or empirically or by simulation. The predetermined value may be determined as residual charge based on the obtained relationship such that the current value of the lower arm of the step-up converter 22 does not exceed the predetermined current value $I_{TH}$.

In this way, when residual charge remaining in the fuel cell stack 12 is discharged, the discharge control device 102 controls the SW control device 101 such that the transistor 225 serving as a switching element continues to maintain the on state in a second period subsequent to the first period. This control is continued until residual charge remaining in the fuel cell stack 12 is sufficiently discharged. As a result, for example, as shown in FIG. 3, the current value of the lower arm of the step-up converter 22 asymptotically approaches zero (see "second period" in FIG. 3). This control may be referred to as "normal short circuit" in contrast to the "multiple short circuits". The "second period" may be regarded as a period during which residual charge remaining in the fuel cell stack 12 is less than the predetermined value.

Figure 4:
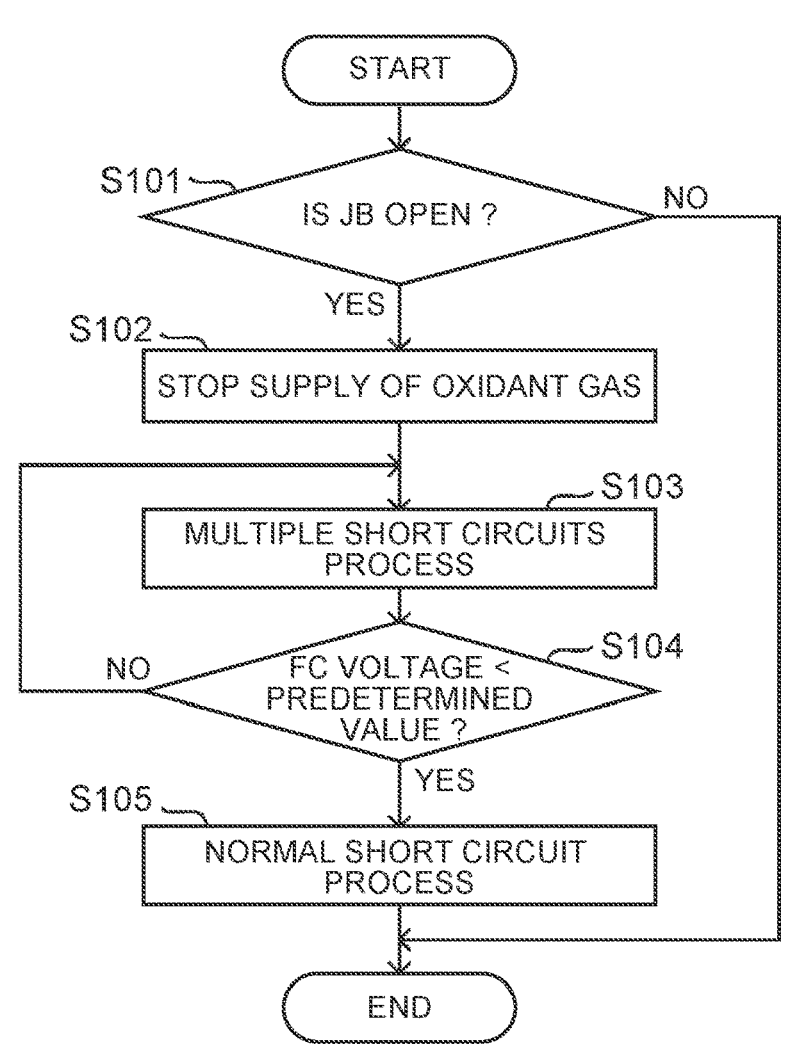
FIG. 4 is a flowchart that shows the operations of a controller.

The operation of the discharge control device 102 will be additionally described with reference to the flowchart of FIG. 4. As shown in FIG. 4, the discharge control device 102 determines based on the output of the sensor 31 whether the lid of the junction box (JB) 30 is open (step S101). When the discharge control device 102 determines in the process of step S101 that the lid of the junction box 30 is not open (No in step S101), the operation shown in FIG. 4 is stopped. After that, the process of step S101 may be executed after a lapse of a predetermined period. In other words, the operation shown in FIG. 4 may be repeated at a period according to the predetermined period.

When the discharge control device 102 determines in the process of step S101 that the lid of the junction box 30 is open (Yes in step S101), the discharge control device 102 controls the valve 41 such that oxidant gas is not supplied to the fuel cell stack 12 (step S102). In parallel with the process of step S102, the discharge control device 102 sets the transistor 223 of the step-up converter 22 to the off state and controls the SW control device 101 such that the transistor 225 is switched between the on state and the off state alternately. Thus, a short circuit of the fuel cell stack 12 and a release of the short circuit are repeated in a relatively short period. In other words, the discharge control device 102 executes a process concerned with multiple short circuits (step S103).

The discharge control device 102, for example, estimates residual charge remaining in the fuel cell stack 12 based on the output current or output voltage of the fuel cell stack 12. The discharge control device 102 determines whether the estimated residual charge is less than the predetermined value (step S104). When the discharge control device 102 determines in the process of step S104 that the estimated residual charge is greater than the predetermined value (No in step S104), the discharge control device 102 continues multiple short circuits. In step S104 of FIG. 4, "FC VOLT-AGE" is written as an example of the estimated residual charge remaining in the fuel cell stack 12.

When the discharge control device 102 determines in the process of step S104 that the estimated residual charge is less than the predetermined value (Yes in step S104), the discharge control device 102 controls the SW control device 101 such that the transistor 225 continues to maintain the on state. In other words, the discharge control device 102 executes a process concerned with normal short circuit (step S105). When the estimated residual charge is equal to the predetermined value in the process of step S104, this case may be included in any one of the cases.

Technical Advantageous Effects

As described above, when the sensor 31 detects that the lid of the junction box 30 is open, the discharge control device 102 executes a process concerned with multiple short circuits in a first period and executes a process concerned with normal short circuit in a second period subsequent to the first period. Thus, it is possible to reduce residual charge remaining in the fuel cell stack 12 in a relatively short time while avoiding activation of the mechanism for protecting against overcurrent. Therefore, with the power supply control apparatus 100, within, for example, a predetermined time stipulated in the laws and regulations after the lid of the junction box 30 is opened, the voltage between the terminals T1, T2 disposed in the junction box 30 is decreased.

In addition, with the above-described electric discharge method, the voltage between the terminals T1, T2 is relatively quickly decreased without using a relay. Therefore, for example, it is not necessary to consider space for mounting a relay when the vehicle 1 is designed. In other words, it is possible to provide space saving and to reduce a cost.

Instead of short-circuiting the fuel cell stack 12, for example, a method of consuming residual charge remaining in the fuel cell stack 12 with the drive motor 11 is also conceivable. However, it turned out through the research of the inventors of the present application that this method needs relatively long time to discharge the fuel cell stack 12.

Various aspects of the disclosure derived from the embodiment described above will be described below.

A first aspect of the disclosure relates to a power supply control apparatus that controls a power supply. The power supply has a fuel cell, a gas supply unit configured to supply oxidant gas to the fuel cell, and a power converter having a plurality of switching elements and configured to convert electric power output from the fuel cell. The power supply control apparatus includes a switching control device and a discharge control device. The switching control device is configured to switch each of the plurality of switching elements between an on state and an off state alternately. The discharge control device is configured to, when residual charge remaining in the fuel cell is being discharged, control the gas supply unit such that the oxidant gas is not supplied to the fuel cell, in a first period, control the switching control device such that an on time that is a time during which at least one switching element of the plurality of switching elements is maintained in the on state is longer than the on time allowed to be taken during an operation of the fuel cell and the at least one switching element is switched between the on state and the off state, and, in a second period subsequent to the first period, control the switching control device such that the at least one switching element continues to maintain the on state.

In the above-described embodiment, the "fuel cell stack 12" corresponds to an example of the "fuel cell", the "transistors 223, 225" correspond to an example of the "switching elements", the "step-up converter 22" corresponds to an example of the "power converter", the "valve 41" corresponds to an example of the "gas supply unit", the "switching control device 101" corresponds to an example of the "switching control device", and the "discharge control device 102" corresponds to an example of the "discharge control device".

In the above aspect, the second period may be a period during which the residual charge is less than a predetermined value.

In the above aspect, the discharge control device may be configured to determine whether the residual charge is less than the predetermined value, and the discharge control device may be configured to, when the discharge control device determines that the residual charge is less than the predetermined value, control the switching control device such that the at least one switching element continues to maintain the on state.

In the above aspect, the discharge control device may be configured to estimate the residual charge based on an output current of the fuel cell in the first period. Alternatively, the discharge control device may be configured to estimate the residual charge based on an output voltage of the fuel cell in the first period.

A second aspect of the disclosure relates to an electric discharge method. The electric discharge method is an electric discharge method of discharging residual charge remaining in a fuel cell in a power supply. The power supply has a fuel cell, a gas supply unit configured to supply oxidant gas to the fuel cell, a power converter having a plurality of switching elements and configured to convert electric power output from the fuel cell, and a switching control device configured to switch each of the plurality of switching elements between an on state and an off state alternately. The electric discharge method includes controlling the gas supply unit such that the oxidant gas is not supplied to the fuel cell, in a first period, controlling the switching control device such that an on time that is a time during which at least one switching element of the plurality of switching elements is maintained in the on state is longer than the on time allowed to be taken during an operation of the fuel cell and the at least one switching element is switched between the on state and the off state alternately, and, in a second period subsequent to the first period, controlling the switching control device such that the at least one switching element continues to maintain the on state.

The disclosure is not limited to the embodiment described above. The disclosure is not limited to, for example, the power supply system including the fuel cell stack 12 mounted on the vehicle 1 and is applicable to various power supply systems including a fuel cell stack. In other words, the disclosure may be modified as needed without departing from the scope or idea of the disclosure that can be read from the appended claims and the full text of the specification. Power supply control apparatuses and electric discharge methods with such modifications are also included in the technical scope of the disclosure.

What is claimed is:

1. A power supply control apparatus that controls a power supply, the power supply having a fuel cell, a gas supply unit configured to supply oxidant gas to the fuel cell, and a power converter having a plurality of switching elements and configured to convert electric power output from the fuel cell, the power supply control apparatus comprising:

a switching control device configured to switch each of the plurality of switching elements between an on state and an off state alternately; and a discharge control device configured to, when residual charge remaining in the fuel cell is being discharged, control the gas supply unit such that the oxidant gas is not supplied to the fuel cell, in a first period, control the switching control device such that an on time that is a time during which at least one switching element of the plurality of switching elements is maintained in the on state is longer than the on time allowed to be taken during an operation of the fuel cell and the at least one switching element is switched between the on state and the off state alternately, and in a second period subsequent to the first period, control the switching control device such that the at least one switching element continues to maintain the on state.

2. The power supply control apparatus according to claim 1, wherein the second period is a period during which the residual charge is less than a predetermined value.

3. The power supply control apparatus according to claim 2, wherein:

the discharge control device is configured to determine whether the residual charge is less than the predetermined value; and the discharge control device is configured to, when the discharge control device determines that the residual charge is less than the predetermined value, control the switching control device such that the at least one switching element continues to maintain the on state.

4. The power supply control apparatus according to claim 1, wherein the discharge control device is configured to estimate the residual charge based on an output current of the fuel cell in the first period.

5. The power supply control apparatus according to claim 1, wherein the discharge control device is configured to estimate the residual charge based on a voltage of the fuel cell.

6. An electric discharge method of discharging residual charge remaining in a fuel cell in a power supply, the power supply having the fuel cell, a gas supply unit configured to supply oxidant gas to the fuel cell, a power converter having a plurality of switching elements and configured to convert electric power output from the fuel cell, and a switching control device configured to switch each of the plurality of switching elements between an on state and an off state alternately, the electric discharge method comprising:

controlling the gas supply unit such that the oxidant gas is not supplied to the fuel cell;

in a first period, controlling the switching control device such that an on time that is a time during which at least one switching element of the plurality of switching elements is maintained in the on state is longer than the on time allowed to be taken during an operation of the fuel cell and the at least one switching element is switched between the on state and the off state alternately; and in a second period subsequent to the first period, controlling the switching control device such that the at least one switching element continues to maintain the on state.

* * * * *